(12) United States Patent
Lapidot et al.

(10) Patent No.: US 11,812,342 B2
(45) Date of Patent: Nov. 7, 2023

(54) CELLULAR-BASED NAVIGATION METHOD

(71) Applicant: VEERIDE GEO LTD., Rehovot (IL)

(72) Inventors: Zvi Lapidot, Rehovot (IL); Ehud Tirosh, Mevaseret Zion (IL)

(73) Assignee: VEERIDE GEO LTD., Rehovot (IL)

( * ) Notice: Subject to any disclaimer, the term of this patent is extended or adjusted under 35 U.S.C. 154(b) by 0 days.

(21) Appl. No.: 17/633,665

(22) PCT Filed: Sep. 8, 2020

(86) PCT No.: PCT/IL2020/050977
§ 371 (c)(1),
(2) Date: Feb. 8, 2022

(87) PCT Pub. No.: WO2021/048841
PCT Pub. Date: Mar. 18, 2021

(65) Prior Publication Data
US 2022/0295229 A1  Sep. 15, 2022

(30) Foreign Application Priority Data

Sep. 10, 2019 (IL) .......................................... 269263

(51) Int. Cl.
*H04W 4/029* (2018.01)
*G01S 19/39* (2010.01)
(Continued)

(52) U.S. Cl.
CPC ........... *H04W 4/029* (2018.02); *G01S 19/071* (2019.08); *G01S 19/396* (2019.08); *G01S 19/41* (2013.01); *H04W 4/023* (2013.01)

(58) Field of Classification Search
CPC ....... H04W 64/00; H04W 4/02; H04W 4/029; H04W 4/023; G01S 19/41; G01S 19/07; G01S 19/396; G01S 19/071
See application file for complete search history.

(56) References Cited

U.S. PATENT DOCUMENTS 5,774,831 A * 6/1998 Gupta ..................... G01S 19/40
701/481
6,351,711 B1 * 2/2002 Chansarkar ............. G01S 19/42
701/481
(Continued)

FOREIGN PATENT DOCUMENTS

| CN | 101566474 A | * | 10/2009 | |
| CN | 101438335 B | * | 9/2011 | ......... G01C 21/3691 |

(Continued)

OTHER PUBLICATIONS

Indian Examination Report for Application No. 202247019007 dated Aug. 25, 2022.

(Continued)

*Primary Examiner* — Dung Hong
(74) *Attorney, Agent, or Firm* — Moser Taboada

(57) ABSTRACT

A method for creating a correction function for improving the accuracy of a GPS device collects multiple time samples at multiple known locations wherein each time sample consists of GPS coordinates and associated satellite data from multiple satellites. The satellite data includes or permits determination of (i) satellite azimuth and elevation of an associated satellite, (ii) Signal-to-Noise Ratio of a received signal from the associated satellite, and optionally (iii) pseudo-range. For each time sample a respective error between the known location and the corresponding GPS coordinates is computed and an error correction function is created as a function of the respective GPS coordinates and the satellite data by applying deep learning/machine learning techniques to the multiple time samples.

9 Claims, 3 Drawing Sheets

(51) Int. Cl.
  *G01S 19/07* (2010.01)
  *G01S 19/41* (2010.01)
  *H04W 4/02* (2018.01)

(56) References Cited

U.S. PATENT DOCUMENTS

| | | |
|---|---|---|
| 9,020,755 B1 | 4/2015 | Gazit et al. |
| 2011/0257885 A1 | 10/2011 | Tuck et al. |
| 2012/0197519 A1* | 8/2012 | Richardson ........ G01C 21/3647 |
| | | 701/508 |
| 2017/0307761 A1 | 10/2017 | Scot et al. |
| 2018/0124572 A1* | 5/2018 | Cardoso de Moura ...................... |
| | | H04W 4/80 |
| 2019/0147610 A1 | 5/2019 | Frossard et al. |

FOREIGN PATENT DOCUMENTS

| | | | | |
|---|---|---|---|---|
| CN | 109507706 A | * | 3/2019 | ............. G01S 19/48 |
| JP | 2004028916 A | | 1/2004 | |
| KR | 20200116729 A | | 10/2020 | |
| WO | WO 2018/222274 A1 | | 12/2018 | |
| WO | WO-2018222274 A1 | * | 12/2018 | ............. G01S 19/07 |

OTHER PUBLICATIONS

International Search Report and Written Opinion for application No. PCT/IL2020/050977 dated Mar. 16, 2021.

* cited by examiner

CELLULAR-BASED NAVIGATION METHOD

FIELD OF THE INVENTION

This invention relates to navigation systems and methods particularly for use by pedestrians.

BACKGROUND OF THE INVENTION

With the advent of smart phones, GPS has become widely used by pedestrians and drivers as a principal method of navigation. Of high importance is the use of smartphones GPS by pedestrians in urban area, instead of the traditional paper maps.

However, pedestrian use of GPS is inconvenient, difficult and sometimes impossible owing to the low positioning accuracy of mobile phones' GPS systems, mainly in urban areas. Furthermore, owing to the low accuracy of mobile phone magnetometers, pedestrians do not have the orientation data needed for navigation.

The main reason for the low accuracy of GPS systems in urban areas is the obstruction of the lines of sight to satellites due to high buildings. Furthermore, signals from satellites not having direct line of sight are rather reflected by the high buildings, received by the pedestrian's GPS and wrongly interpreted to result in large errors in positioning readings. This phenomenon is referred to as "multiple path reflection".

Although multiple path reflection affects motor vehicles as well as pedestrians, it is less pronounced in motor vehicles because, since they are constantly on the move at significantly higher speeds than pedestrians, their respective satellite visibilities are constantly and rapidly changing and errors can therefore be smoothed. Also, since the location of cars and other road vehicles is restricted to roads, techniques such as "snap to map" and utilization of IMU (Inertial Measurement Unit) data and other information are used. In addition, direction is known to high accuracy by the GPS motion and velocity.

This drawback has become a major issue for companies like Uber and Lyft, where successful passenger pickup by a driver highly depends on the location accuracy reported by the passenger's GPS. Driver and client may miss each other just because the client is across the street or across a junction.

Attempts have been made to solve this issue, including 3D modelling of the surrounding buildings to ignore satellites having multiple reflection, phase analysis and statistical methods. However, to the best of our knowledge no practical, cost-effective solution has been proposed.

There is a wealth of prior art relating to localization of autonomous vehicles and to optimization of localization strategies used by an autonomous vehicle based on a driving context, for example, the geographical region in which the autonomous vehicle is driving, the time of day, the speed of the autonomous vehicle, and so on. In conventional systems, a map database may be used to snap an initial location calculated from the navigation satellite system data to a physical geographical object, such as, a road, for a final output displayed by the navigation device. By such means disclosed, for example, in US20110257885 the coarse location provided by the GPS satellites may be significantly improved, sufficient for guiding vehicles whether autonomous or driven.

US20170307761 discloses a method of collaborative determination of positioning errors of a satellite-based navigation system. Positioning receivers that are not very precise, such as smartphones, present in a geographical zone, of unknown precise position, can contribute to the production of precise atmospheric error corrections if the receivers are sufficiently numerous.

US20180124572 relates to correcting GPS-based position information using local correction information in a network of moving things. If two receivers share the same set of visible satellites (i.e., are processing received signals from the same set of satellites in arriving at a positioning solution) the two receivers should experience similar positioning errors. The set of satellites used by a GNSS/GPS receiver in the calculation of geographic positioning information is dynamic and constantly changing due to a number of factors.

US20190147610 in the name of Uber Technologies, Inc. discloses systems and methods for detecting and tracking objects based on sensor data received from one or more sensors and which is fed to one or more machine-learned models including one or more first neural networks configured to detect one or more objects based at least in part on the sensor data and one or more second neural networks configured to track the one or more objects over a sequence of sensor data.

In summary, the prior art teaches techniques for correcting for satellite errors and recognizes that errors corrections associated with satellites that serves multiple receivers in the same geographic zone will be applicable to all receivers in that zone. The prior art also discloses collating data from vast numbers of vehicles traversing a geographic area and using the data received therefrom for improving a map that allows autonomous vehicles to navigate safely along the same roads. The prior art also addresses the need for driverless taxis to locate stationary passengers and provides techniques for navigation of moving pedestrians, recognizing the fact that conventional correction approaches applied to vehicles are not always applicable to pedestrians. The prior art discusses the use of deep learning and neural networks to improve map data.

But there appears to be no suggestion in the art to process GPS positioning errors in bulk to create respective correction functions for multiple known locations as a function of the respective GPS coordinates and the satellite data by applying deep learning/machine learning techniques to multiple time samples.

Nor has it been suggested to use error correction data associated with satellites in a geographic area to apply corresponding or derived corrections to a GPS navigation system of a pedestrian carrying on his or her person a mobile device such as a smartphone.

SUMMARY OF THE INVENTION

It is therefore an object of the present invention to provide a method that addresses this need.

This object is realized in accordance with the invention by a two-part procedure. The first part is a learning method that creates an error correction function for improving the accuracy of a GPS device in a region of interest, while the second part provides a method for improving the accuracy of GPS coordinates received in a region of interest, using the error correction function which has already been determined. Within the context of the description and appended claims, the term "GPS device" is used to refer to any device having a built-in GPS module. The GPS device is most typically a smartphone but may be any other suitable device configured for GPS positioning.

Thus, in its first aspect, the invention provides a method for creating an error correction function for improving the accuracy of a GPS device, the method comprising:

collecting multiple time samples at multiple known locations wherein each time sample consists of GPS coordinates and associated satellite data from multiple satellites, wherein the satellite data includes or permits determination of (i) satellite azimuth and elevation of an associated satellite, and (ii) Signal-to-Noise Ratio of a received signal from the associated satellite;

for each time sample computing a respective error between the known location and the corresponding GPS coordinates; and creating an error correction function as a function of the respective GPS coordinates and the satellite data by applying deep learning/machine learning techniques to the multiple time samples.

In its second aspect, the invention provides a method for improving the accuracy of GPS coordinates received in a region of interest, for which a correction function has been obtained, the method comprising:

inputting the GPS coordinates and associated satellite data to the correction function, so as to obtain a location with improved accuracy.

The two procedures are mutually independent. Specifically, while the second procedure cannot be implemented until there has been derived an error correction function pertaining to a required region of interest, once the error correction function exists, the second procedure can be implemented in standalone manner. In this case, the two procedures are carried out sequentially. But they can also be carried out concurrently whereby the learning procedure is executed at the same time as implementing the second aspect either in respect of a different region of interest or to refine the error correction function by continually gathering new data and applying deep learning techniques to a continually expanding dataset.

In some embodiments the multiple time samples are obtained by collecting time samples from motor vehicles driving in an extended urban area and having on-board GPS devices and enhanced accuracy positioning, each of the time samples consisting of the GPS coordinates and associated satellite data obtained by the on-board GPS devices and the enhanced accuracy location.

Conceptually, the principle of the invention resides in repeating the above method for multiple locations over time in a required geographic area, so as to obtain multiple time samples for each location. The GPS coordinates are the coordinates of the GPS device typically obtained by triangulating between three or more satellites and represent coarse locations, the accuracy of which the invention serves to improve. The GPS data is determined from satellite signals which include the time on which the signals were transmitted by the respective satellite. The GPS device records the time on which the signals were received, and the difference between the times of transmission and receipt reflects the time of flight between the satellites to the GPS device, which when multiplied by the speed of light, results in the pseudo-range between the satellites and the receiver. This is referred to as "pseudo-range" because unlike the highly accurate atomic clocks of the satellites, the GPS devices' clocks are not as accurate. Therefore, at least four satellites are needed to solve for the GPS device's coarse location in known manner. The resulting data are stored in a database and analysed to derive a function for each coarse location that, when applied to GPS coordinates and using the satellite data obtained for the coarse location, corrects the GPS coordinates and yields a more precise location. The degree of precision may be improved by an order of magnitude, such that if the coarse location is correct to within 30 meters, the location as corrected by the invention will be accurate to within three meters or less. It will be understood that in practice it may not be possible to map every coordinate in space. But it is assumed that a sufficient number of points in close mutual proximity are mapped over time, so that the computed error correction function is equally applicable for location of any point in space that deviates slightly from the mapped points.

It will be understood that each time sample may consist of different GPS coordinates and different satellite data. This implies that different GPS coordinates having different associated satellite data, may correlate to the same corrected location. The error correction function is derived such that regardless as to which set of GPS coordinates and associated satellite data it is applied, it will give the same corrected location.

The GPS coordinates and the associated satellite data and location errors for multiple points in the region of interest are stored in a database for subsequent processing. In some embodiments, the database is compiled based on data collected by a navigation system such as Waze™. Such systems in any case collect from vehicle GPS devices a coarse location, i.e. the associated GPS coordinates, and convey enhanced location data to the vehicles. The only additional information that is, therefore, required is the satellite data corresponding to each of the satellites from whose signals each coarse location is obtained. This information is, of course, known to the on-board GPS from which it can be collected and used to compile the database and derive correction functions for the present invention. In use, a coarse location received from a GPS device is then fed together with the satellite data and the enhanced location coordinates to the database. This database is used to derive a correction function using deep learning technique.

A pedestrian carrying a smartphone having an in-built GPS device can, at best, obtain only a coarse location even if the smartphone uses a navigation system such as Waze™. As noted above, this is because enhanced accuracy is applied by the navigation system to vehicles, which are constrained to travel along defined paths cannot be applied to the pedestrian who are free to roam. Furthermore, as explained above, errors caused by multiple path reflection in urban areas impact more heavily on pedestrian devices, which are stationary or progress more slowly than they do on motor vehicles. However, in accordance with the invention, since the correction function is based on and applied to the coarse location, it may equally be applied to the GPS device in the pedestrian's smartphone to derive a more accurate location. Likewise, techniques such as RADAR, LIDAR and other enhancements being developed for use by Advanced Driver Assistance Systems (ADAS) may be used to determine enhanced location accuracy. The correction function can be downloaded to the pedestrian's smartphone from a remote server in communication with the pedestrian's GPS device; or it may be stored in the pedestrian's GPS device if there is sufficient memory.

The error correction function receives as input a vector consisting of a coarse location corresponding to GPS coordinates and associated satellite data from which the GPS coordinates were obtained and produces as output a true location.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
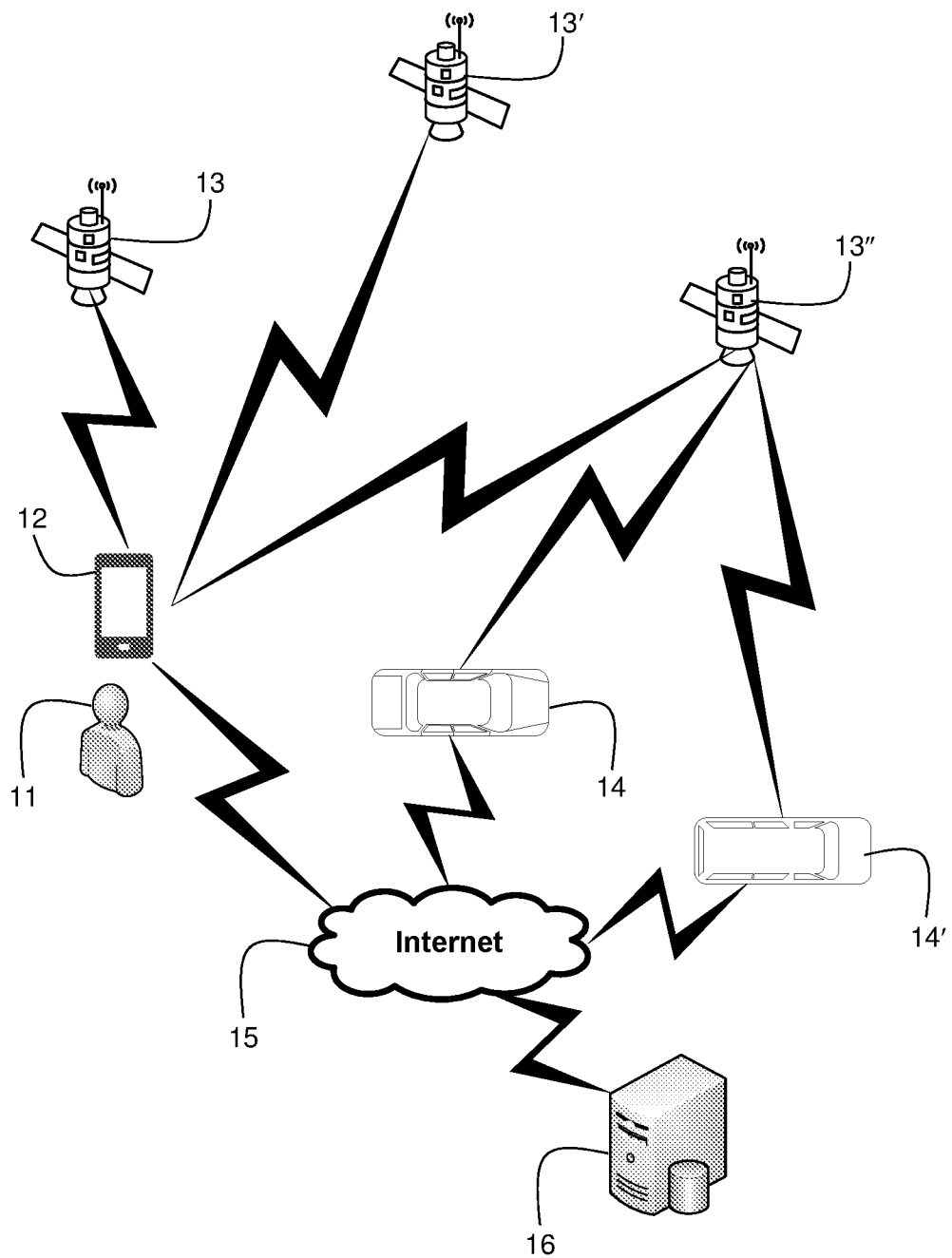
FIG. 1 is a pictorial representation of a system according to the invention.

FIG. 1 is a pictorial representation of a system 10 according to one embodiment of the invention. The system 10 shows a pedestrian 11 located in a region of interest holding a smartphone 12 having a built-in GPS module that receives GPS data from at least three satellites 13, 13' and 13" and computes a coarse location in known manner using triangulation. Throughout this description and the appended claims, we will refer to the coarse location as the GPS coordinates of the GPS device. Vehicles 14, 14' that randomly drive through the region of interest likewise receive GPS data from satellites and determine respective coarse locations of the vehicles. However, the vehicles are equipped with navigation system such as WAZE™, SAT-NAV™ and the like which enhance accuracies in the GPS coordinates so that the correct or true locations of the vehicles are known. For the sake of clarity, by "true" or "correct" it is not intended to imply that the corrected locations are precise in absolute terms, but rather that they are significantly more accurate than the coarse locations based only on the coordinates. Anyone who has used a navigation system such as WAZE™ is well aware that they are instructed in advance to turn left at the next junction and when they are on top of the junction are instructed "turn left". It is this level of accuracy this renders navigation systems so reliable and user-friendly.

The navigation systems in the vehicles enhances the accuracy for the coarse locations based solely on the satellite data, using auxiliary data, based for example, on accurate maps that have been pre-compiled and which allow the location of the vehicle to be corrected using known techniques such as snap to map.

Likewise, techniques such as RADAR, LIDAR and other enhancements being developed for use by Advanced Driver Assistance Systems (ADAS) may be used to determine enhanced location accuracy.

Although only two vehicles are shown in the figure, it is to be understood that in practice there are thousands of vehicles driving over time along charted routes such as highways, roads, streets and even off-road paths whose locations have been accurately mapped and are accessible to the vehicle navigation systems either because map data is pre-loaded or because they are able to access the map data on-line, typically over the Internet 15. The satellite data received by the vehicle navigation systems includes or permits determination of satellite azimuth and elevation of each associated satellite, Signal-to-Noise Ratio of a received signal from the associated satellite, and optionally other data such as pseudo-range.

The invention is based on collection and storage in a database of time samples consisting of coarse location, satellite data and true location, and deriving error correction functions using deep learning collated over time from motor traffic moving along charted routes in a region of interest wherein the GPS device is located. To this end, the invention comprises two distinct stages, which are now described.

Data Gathering and Learning:

There are now described the principal operations carried out by the first procedure. GPS errors in specific known locations under various satellite and environmental conditions are collected over time, covering an extensive set of positioning errors and satellites data.

Figure 2:
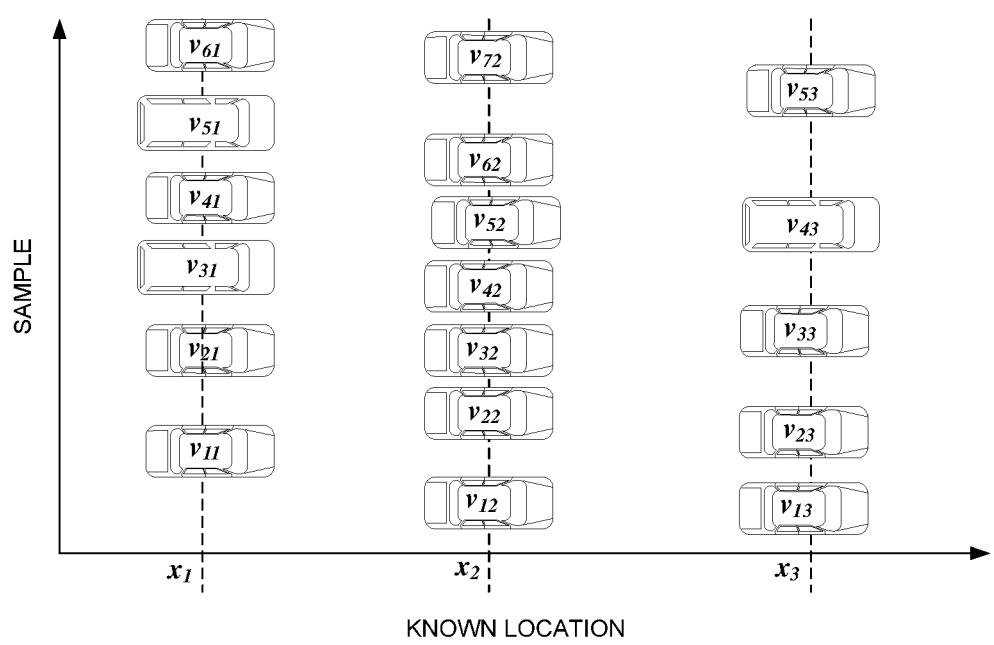
FIG. 2 shows schematically multiple time samples collected and stored randomly over time by vehicles for regions of interest that may be used to generate a database according to an embodiment of the invention.

Although the data can theoretically be collected by mapping locations manually in much the same way that ordnance survey maps were originally compiled, in order to obtain sufficient data quickly and automatically over an extended area, data may be collected from motor vehicles traveling within the desired area over a period of time. FIG. 2 shows schematically multiple time samples obtained randomly by motor vehicles passing known locations in a region of interest, whereby over an extended period of time, multiple time samples are collected for each known location. Thus, by way of simple illustration, there are shown three locations $x_1$, $x_2$ and $x_3$ through which vehicles pass at random and convey the coarse GPS locations, the satellite data and the enhanced locations to the database server. It is seen that over a given time period, six vehicles designated $v_{11}$ $v_{61}$ pass through location $x_1$; seven vehicles designated $v_{12}$ . . . $v_{72}$ pass through location $x_2$ and five vehicles designated $v_{13}$ . . . $v_{53}$ pass through location $x_3$. Although not important, it may be noted from FIG. 2 that the actual times of each sample may well vary for each known location. GPS navigation systems in the vehicles constantly receive the coarse GPS locations and satellite data and derive the enhanced locations. Likewise, although the vehicles have discrete designations, this is for the sake of clarity. In practice, any given vehicle passes through multiple locations and therefore not all the vehicles arriving at the three discrete locations $x_1$, $x_2$ and $x_3$ are different. Indeed, it may also occur that a vehicle passes through the same known point more than once e.g. on an outward journey and on a return journey, or as a result of a repeat journey by the same vehicle in a subsequent time period. The collected information includes the coarse GPS location, the satellite status data and the true location. This allows the positioning error to be determined. Since most motor vehicles today have GPS navigation systems and motor vehicles cover most urban areas, data from a large region of interest can be collected over time. As a result, respective data corresponding to a vast number of locations in large urban areas are collected, including coarse and corrected positions, positioning errors, and associated satellite data. These data serve as input for deriving an error correction function using deep learning techniques. The error correction function is configured to receive as input a vector consisting of a coarse location corresponding to GPS coordinates and associated satellite data and to produce as output a true location. As more vehicles traverse known points within the region of interest, their data may be collected and stored thus allowing the error correction function to be further refined over time.

Estimating GPS Deviation Using Deep Neural Network (DNN)

We assume that at a given point with a known location (x, y, z), we get an estimated location (x', y', z') produced by a GPS system. The difference (x-x', y-y', z-z') between the true location and the GPS-produced location is called the GPS-deviation. The task we consider is estimating the GPS-deviation in order to correct the location produced by the GPS system, and obtain the correct location as accurately as possible.

The task can be approached using standard methods of training deep neural networks (DNNs). An example of training a DNN for the task will proceed as follows based on He, K, Zhang, X, Ren, S, Sun, J. 2015 *"Deep Residual Learning for Image Recognition"* arXiv:1512.03385 (He et al.) The input to the network is a vector of parameters produced by the GPS system (GPS data), including satellite positions, signal strengths, times of measurements and other possible parameters. For each given location, such data is collected at multiple times. The DNN output is the estimated deviation, for instance expressed as the probability distribution over a set of deviations. Training is done using a loss function, such as the cross entropy between the known deviation and the estimated deviation produced by the DNN. A possible state-of-the-art architecture for the task can be a ResNet DNN of sufficient depth as described by He et al, using standard training procedures, e.g. in terms of splitting the data into training and testing sets, searching for good training rates, using batch normalization, and the like. To get a sufficient amount of data for training the network, the training procedure may use data from multiple different locations at multiple times. It is important to note that though the method described by He et al. was applied to images, it is a general architecture that is equally applicable to the present invention.

Correction:

The correction model is used to correct the GPS errors at any point, as a function of satellite data (as defined above). Thus, in use, a navigation system or an application in a GPS device such as a smartphone within a region of interest receives the coarse GPS location and associated satellite data, and obtains and applies the correction function to the coarse GPS coordinates in order to derive the corrected location.

Applications

Deriving Orientation of a Person Using a Hand-Held Digital Map Device

Although digital maps have greatly simplified navigation for pedestrian use, the need for the pedestrian to correctly orientate the map remains a frequent drawback. In conventional printed maps, the user identifies where on the map he or she is located, identifies a landmark such as a street and then aligns the landmark on the map with the landmark in the real scene so that the map is correctly aligned with the real scene. Smartphones attempt to do this using an inertial magnetic unit (IMU) that attempts to align an internal magnetometer which serves as compass with due north so that a user standing at a known location knows whether to turn left or right or move forward or backwards.

In practice, as is well known by tourists trying to navigate to unfamiliar places, this does not work reliably and it is common for a user to realize that he or she has gone the wrong way after walking for some time and encountering landmarks such as streets that the map shows are located in the opposite direction. This also applies to navigation software that provides vocalized instructions.

In one application, the invention uses a smartphone having an integral camera to image a scene having an identifiable landmark and point the camera of the smartphone to the landmark. When properly aligned, an application in the smartphone is manually actuated by the user, to find the landmark in Street View image. This allows the smartphone application to determine the landmark's location and since the user's location, corresponding to that of the smartphone, is accurately known the application is able to determine the azimuth of the landmark relative to the user's location.

Thus, in the case that the user device is a smartphone having a built-in GPS device, there may be stored in the smartphone a software application that determines orientation by:
 i. determining a location of the smartphone using said GPS device;
 ii. pointing a line of sight unit having an IMU to a distinct object in the real scene;
 iii. identifying an image of the object on Street View image displayed on a screen of the smartphone;
 iv. extracting a location of the object from the Street View database;
 v. calculating azimuth of the object relative to the location of the smartphone to allow a user holding the smartphone to orientate himself in space relative to the object.

It should be noted that "Street View" is the name of a proprietary program of Google, Inc. Owing to the fact that Google, Inc. has invested heavily in the development of Street View and to its easy availability the invention preferably uses Google's Street View. However, any digital map database wherein landmarks are resolved to street level would be usable and therefore within the context of the appended claims, the term "Street View" is not intended to limit the scope of the claims to Google's Street View map but rather to any digital map database having similar functionality.

Improving Driver/Passenger Encounter

In one embodiment, the invention may be used to allow a passenger waiting at a street corner or other location to convey the exact location to a taxi driver equipped with a navigation system enabling enhanced positioning so that the taxi driver knows exactly where to meet the passenger. Commonly, the passenger uses his or her mobile device to obtain his location, which he then conveys to the taxi driver. But for the reasons elaborated previously, the location obtained by the passenger's mobile device is prone to errors. As a result, even though the taxi may arrive very close to the passenger, the taxi driver may not identify the passenger. In practice, this is typically resolved by the driver phoning the passenger or vice versa and providing suitable directions. But this is inconvenient and time-consuming and is also not feasible when the taxi is an autonomous vehicle.

The invention provides a remedy because when the taxi gets within pickup distance to the passenger, it may be assumed that the GPS positioning error corresponding to the taxi's location is applicable also to the passenger and may therefore be used to correct the passenger's GPS positioning. So the taxi driver receives the coarse GPS location from the passenger and his satellite data and when the satellite data received from the passenger matches that of the taxi, applies a correction that enables him to locate the exact location of the passenger without the need for verbal directions.

Figure 3:
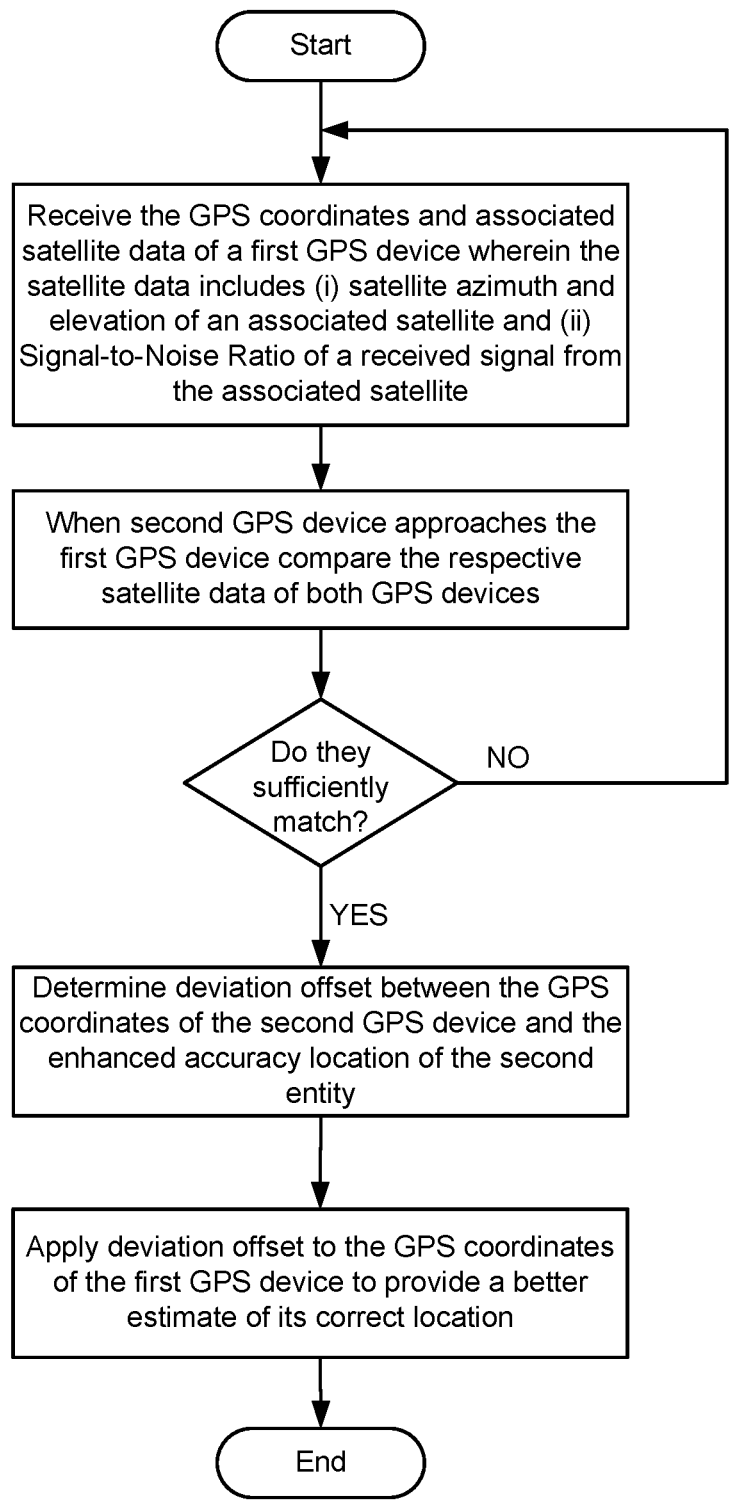
FIG. 3 is a flow diagram showing the principal operations executed by a method according to an embodiment of the invention for improving passenger/driver encounter.

More generally this aspect of the invention provides a method for locating a first entity by a second entity carrying respective first and second GPS devices, the second entity having a navigation system that provides an enhanced accuracy location of the second entity based on GPS coordinates of the second GPS device. FIG. 3 is a flowchart showing the principal operations in such a method carried out by the second entity:
 i. receiving the respective GPS coordinates and associated satellite data of the first GPS device wherein the satellite data includes or permits determination of (i)

satellite azimuth and elevation of an associated satellite, (ii) Signal-to-Noise Ratio of a received signal from the associated satellite, and (iii) optionally other data such as pseudo-range;
ii. when the second GPS device approaches the first GPS device comparing the respective satellite data of both GPS devices;
iii. when the respective satellite data of both GPS devices substantially match, determining an offset between the GPS coordinates of the second GPS device and the enhanced accuracy location of the second entity; and
iv. applying said offset to the GPS coordinates of the first GPS device to provide a better estimate of its correct location.

In particular it should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. While typically the computer is a processing unit in a mobile telephone, it is not limited thereto. It can be any other hand-held or head-mounted device. By hand-held is meant a device that in its normal mode of use is held in the hands.

The invention claimed is:

1. A method for creating a correction function for improving the accuracy of a GPS device, the method comprising:
    collecting multiple time samples at multiple known locations wherein each time sample consists of GPS coordinates and associated satellite data from multiple satellites, wherein the satellite data includes or permits determination of (i) satellite azimuth and elevation of an associated satellite, and (ii) Signal-to-Noise Ratio of a received signal from the associated satellite;
    for each time sample computing a respective error between the known location and the corresponding GPS coordinates; and
    creating an error correction function as a function of the respective GPS coordinates and the satellite data by applying deep learning/machine learning techniques to the multiple time samples.

2. A method for improving the accuracy of GPS coordinates in a region of interest for which an error correction function is obtained by a GPS device using the method according to claim 1, the method comprising:
    inputting the GPS coordinates and associated satellite data to the correction function so as to obtain a location with improved accuracy.

3. The method according to claim 2, wherein the error correction function is stored on the GPS device.

4. The method according to claim 2, wherein the error correction function is downloaded to the GPS device from a remote server in communication with the GPS device.

5. Method for improving orientation using a hand-held smartphone having an integral GPS device, the method comprising:
    the GPS device determining a location of the smartphone using the method according to claim 2;
    pointing a line of sight unit having an IMU to a distinct object in said region of interest;
    identifying an image of the object on Street View image displayed on a screen of the smartphone;
    extracting a location of the object from the Street View database;
    calculating azimuth of the object relative to the location of the smartphone to allow a user holding the smartphone to orientate himself in space relative to the object.

6. A computer program product having a memory storing program instructions that, when run on a processor of said GPS device, carry out the method according to claim 2.

7. The method according to claim 2, wherein the satellite data includes or permits determination of (iii) pseudo-range.

8. The method according to claim 1, wherein the error correction function is created by collecting over time samples from motor vehicles driving in an extended urban area and having on-board GPS devices and enhanced accuracy positioning, each of said time samples consisting of the GPS coordinates and associated satellite data obtained by said on-board GPS devices and enhanced accuracy location.

9. The method according claim 1, wherein the satellite data includes or permits determination of (iii) pseudo-range.

* * * * *